United States Patent [19]
Sawada

[11] Patent Number: 5,767,875
[45] Date of Patent: Jun. 16, 1998

[54] PRINTING METHOD AND APPARATUS USING SERIAL PRINT HEAD

[75] Inventor: Hideki Sawada, Kyoto, Japan

[73] Assignee: Rohm Co., Ltd., Japan

[21] Appl. No.: 605,918

[22] Filed: Feb. 23, 1996

[30] Foreign Application Priority Data

Feb. 23, 1995 [JP] Japan ................... 7-034955

[51] Int. Cl.$^6$ ................................. B41J 29/38
[52] U.S. Cl. ........................................ 347/41
[58] Field of Search ................... 347/10, 9, 41, 347/43; 358/298

[56] References Cited

U.S. PATENT DOCUMENTS 4,734,868  3/1988  DeLacy .................. 395/111
5,633,663  5/1997  Matsubara et al. ......... 347/41

FOREIGN PATENT DOCUMENTS 6-238955  8/1994  Japan.

Primary Examiner—Adolf Berhane
Attorney, Agent, or Firm—Fish & Richardson P.C.

[57] ABSTRACT

In a serial type printing apparatus which forms an image with a given dot pitch ($P_D$) in the sheet feed direction, a print head is provided which includes a plurality (n) of dot marking parts arranged with an arrangement pitch ($P_N = M_N P_D$) that is the dot pitch multiplied by an integer number ($m_N$). After termination of one print scanning step by the print head, a sheet is fed with sheet feed pitches ($P_{F1}$, $P_{F2}$) that are larger than the arrangement pitch $P_N$ but smaller than a width (($n-1$)$P_N$) across which the plurality of dot marking parts are arranged, thus width also being the dot pitch multiplied by an integer number. According to such a printing method, the sheet feed can be equalized to suppress banding appearing as a seam extending in the scanning direction at the boundary between the adjacent printed areas due to the precision of a sheet feed mechanism.

12 Claims, 5 Drawing Sheets

PRINTING METHOD AND APPARATUS USING SERIAL PRINT HEAD

BACKGROUND OF THE INVENTION

1. Field of the Invention

The present invention relates to a printing method and apparatus using a serial type print head, and particularly to the relationship between head scan control and sheet feed control.

2. Description of the Prior Art

The conventional serial type print heads comprise a print head including a plurality of dot marking means which are arranged in the sheet feed direction (secondary scan direction). The print head is moved in a direction perpendicular to the sheet feed direction (primary scan direction). One movement of the print head in the primary scan direction prints a band-like area having a given width in the secondary scan direction.

The dot marking means is adapted to provide a mark to the corresponding one of the dots forming a letter to be printed. For example, the dot marking means corresponds to an ink jet nozzle and ink pressurizing mechanism in the ink jet print head and also to a stylus and its driving mechanism in an impact print head. The width of the dot marking means array corresponds to the width of said band-like area. In a printing apparatus having such a print head, the printing operation is repeated to print a plurality of said bank-like areas that are continuous in the sheet feed direction. Such a serial type printing apparatus has a slower printing speed than that of a so-called line type printing apparatus, but is more advantageous in size and cost. Thus, many kinds of serial printing machines have been greatly developed for personal-use.

However, such serial printing machines raise a problem in that a transverse darkened seam may be produced by a slight overlap between the adjacent band-like print areas in the sheet feed direction, or that a whited seam may be created by a slight separation between the adjacent band-like print areas in the sheet feed direction. Such a problem is known as "banding". The banding results from a disagreement between the width of the band-like print area and the feed of the sheet for one movement. Such a problem is essentially likely to occur in all the serial type printing machines.

The banding may be overcome by providing a high-precision sheet feed mechanism. However, this is impracticable when it is required to provide a low-cost printing machine for personal-use. If an ink jet printing machine is to be provided which can accomplish a high print density, such as 360 DPI or 720 DPI, it is almost impossible to provide a sheet feed mechanism having a precision which meets such a high-density dot pitch.

For example, Japanese Patent Laid-Open No. Hei 6-238955 discloses a technique of suppressing the banding when a serial type thermal print head is used to perform color print. Such a technique is adapted to suppress a whited banding due to a difference in height that is created between a color printed and thickened band-like area, that has been thickened as a result of three or four color ink layers, and an area to be printed next. In other words, such a technique aims at suppressing a whited banding which is produced by the presence of a portion of a recording sheet that is not pressed by the thermal print head because of said difference in height. For such a purpose, the above technique slightly shifts each pair of adjacent band-like print areas from each other in the sheet feed direction to disperse the height difference over a plurality of band-like areas.

Considering a single color print, however, the aforementioned technique still does not overcome the problem of banding from the overlap or slight separation between the adjacent band-like printed areas due to the precision in the sheet feed mechanism. Therefore, any transverse seam may be created at the boundary between the adjacent band-like printed areas.

SUMMARY OF THE INVENTION

It is therefore an object of the present invention to provide a printing method and apparatus using a serial type print head which can suppress banding appearing as a transverse seam between the adjacent band-like printed areas due to the precision of a sheet feed mechanism.

To overcome the above problem, the present invention provides the following technical means.

The present invention provides a printing method comprising the steps of scanning a serial print head in a direction perpendicular to the sheet feed direction to mark and print dots based on data with a given dot pitch $P_D$ in the sheet feed direction, said dots being marked through dot marking means of $\underline{n}$ in number which are arranged within a given marking width in the sheet feed direction with a first pitch $P_N$ being said dot pitch multiplied by an integer number $m_N$, the sheet being fed after said scanning step by a second pitch $P_{FO}$ that is larger than the arrangement pitch $P_N$ but smaller than the marking width, and which is actually the dot pitch multiplied by an integer number $m_{FO}$.

In this printing method, further, the integer numbers $m_n$ and $m_{FO}$ may be relatively prime and the integer number $m_{FO}$ may be equal to said number $\underline{n}$.

In the above arrangements, the operation of the present invention will be described when the arrangement pitch $P_N$ of the dot marking parts in the print head is set to be the dot pitch $P_D$ multiplied by four ($=m_N$) and the sheet feed pitch $P_{FO}$ after one print scanning step is set to be the dot pitch $P_D$ multiplied by five ($=m_{FO}$). The first print scanning step of the print head prints the first, fifth, ninth and subsequent dot lines extending in the primary scan direction when these dot lines are counted in the sheet feed direction (secondary scan direction). Through the second print scanning step, the dot marking part prints the first dot line during the first print scanning step then prints the sixth dot line. The dot marking part prints the fifth dot line during the first scanning step then prints the tenth dot line. Subsequently, the sheet feed and print scanning will be sequentially repeated for every five-dot pitch.

Even if a slight error is produced for each sheet feed, therefore, the influence thereof will be dispersed over an increased range in the sheet feed direction (secondary scan direction). Eventually, the banding due to the precision of the sheet feed mechanism will be greatly reduced.

Such an action may be more easily understood in comparison with the following case.

The present invention will not perform printing to fill in the second, third, fourth, sixth, seventh, eighth, tenth and subsequent dot lines extending in the primary scan direction and not printed through the first print scanning step by sequentially feeding the sheet at the dot pitch intervals. If the printing is to be carried out in such a manner, and when the number of dot marking parts in the print head is equal to four, the four head scanning steps will have printed the first to sixteenth dot lines. Prior to printing the seventeenth to thirty-second dot lines through the fifth and subsequent scanning steps, the sheet must be fed at a pitch of twelve times the dot pitch. In other words, each printing step will be independently carried out for each of the corresponding 16-dot line band like areas to be printed. This is basically the same as the operation of the conventional serial print heads, leading to banding at a boundary between the adjacent band-like printed areas.

If extremely different sheet feeds are performed, on one hand, with a 5-dot pitch and, on the other hand, with a 12-dot pitch in the above manner, the errors in the sheet feed become significant and create banding. If a sheet feed error per one-dot pitch direction is invariable, if the sheet is fed with a 12-dot pitch, the error will be increased twelve times and become 2.4 times that of the 5-dot pitch.

According to the present invention, a dot line formed through one print scanning step continuously participates in formation of an image to be formed by setting the arrangement of dot marking parts in the print head and the sheet feed given by each print scanning step as described. This is totally different from the prior art wherein an image is completed by joining band-like printed areas to one another.

The present invention also provides a printing method comprising the steps of scanning a serial print head in a direction perpendicular to the sheet feed direction to mark and print dots based on data with a given dot pitch $P_D$ in the sheet feed direction, the dots being marked through dot marking means of $\underline{n}$ in number that are arranged within a given marking width in the sheet feed direction with a first pitch $P_N$ being the dot pitch multiplied by an integer number $m_n$, the number of dot marking means being the integer number $m_n$ multiplied by an integer number, the sheet being fed with a second pitch $P_{F1}$ after the $km_N$-th scanning step, the second pitch being the dot pitch multiplied by $(n-m_N+1)$, the sheet being fed with a third pitch $P_{F2}$ after any scanning step other than the $km_N$-th scanning step, the third pitch being the dot pitch multiplied by $(n+1)$, $\underline{k}$ being any integer number.

The ratio of the integer numbers n to $m_N$ may be equal to or larger than two.

In such an arrangement, the concentration of errors in the sheet feed can be avoided to suppress the banding, as in the aforementioned printing method. By utilizing two sheet feed pitches, further, the number of dot marking parts can be reduced to perform a real printing step from any earlier dot line.

The present invention further provides a printing apparatus to which each of the aforementioned printing methods can be applied.

Namely, this printing apparatus comprises a serial print head scanned in a direction perpendicular to the sheet feed direction to mark and print dots based on data with a given dot pitch in the sheet feed direction, the print head having dot marking means of $\underline{n}$ in number that are arranged within a given marking width in the sheet feed direction with a first pitch $P_N$ being the dot pitch multiplied by an integer number $m_N$, and a sheet feed mechanism for feeding the sheet, after the previous scanning step, with a second pitch that is smaller than the marking width but is the dot pitch multiplied by an integer number $m_{FO}$, the integer numbers $m_N$ and $m_{FO}$ being relatively prime, the integer number $m_{FO}$ being equal to the number $\underline{n}$.

The present invention further provides a printing apparatus comprising a serial print head scanned in a direction perpendicular to the sheet feed direction to mark and print dots based on data with a given dot pitch $P_D$ in the sheet feed direction, the print head having dot marking means of $\underline{n}$ in number that are arranged within a given marking width in the sheet feed direction with a first pitch $P_N$ being the dot pitch multiplied by an integer number $m_N$, the number of dot marking means being the integer number $m_N$ multiplied by an integer number, and a sheet feed mechanism for feeding the sheet with a second pitch $P_{F1}$ after the $km_N$-th scanning step, the second pitch being the dot pitch multiplied by $(n-m_N+1)$, the sheet feed mechanism also being operative to feed the sheet with a third pitch $P_{F2}$ after any scanning step other than the $km_N$-th scanning step, the third pitch being the dot pitch multiplied by $(n+1)$.

In the above two printing machines, the print head may be of an ink jet type and the dot marking means may be in the form of an ink jet nozzle.

BRIEF DESCRIPTION OF THE DRAWINGS

These and other objects will more be apparent from reading the detailed description, with reference to the accompanying drawings.

DETAILED DESCRIPTION OF THE PREFERRED EMBODIMENTS

Some preferred embodiments of the present invention will now be described in detail with reference to the drawings.

Figure 1:
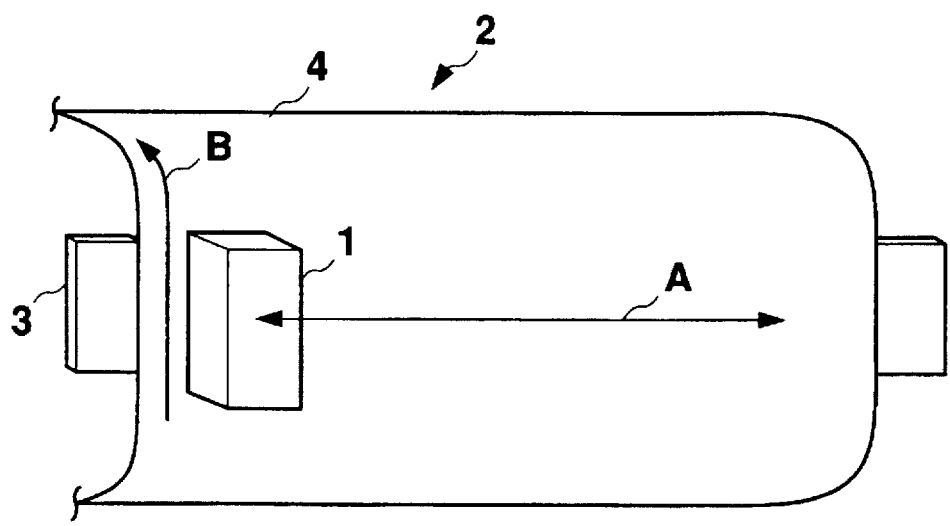
FIG. 1 is a schematic view of a printing apparatus using a serial type print head.

FIG. 1 schematically shows a printing apparatus 2 which uses a serial type print head 1. A recording sheet 4 is fed in a secondary scan direction shown by arrow B by a sheet feed mechanism (not shown) while being backed up by a platen 3. The print head 1 is scanned in a direction perpendicular to the sheet feed direction, that is, a primary scan direction shown by arrow A, along the surface area of the recording sheet 4 backed up by the platen 3, or in such a condition that the print head 1 is separated from the surface of the recording sheet with a given spacing.

Figure 2A:
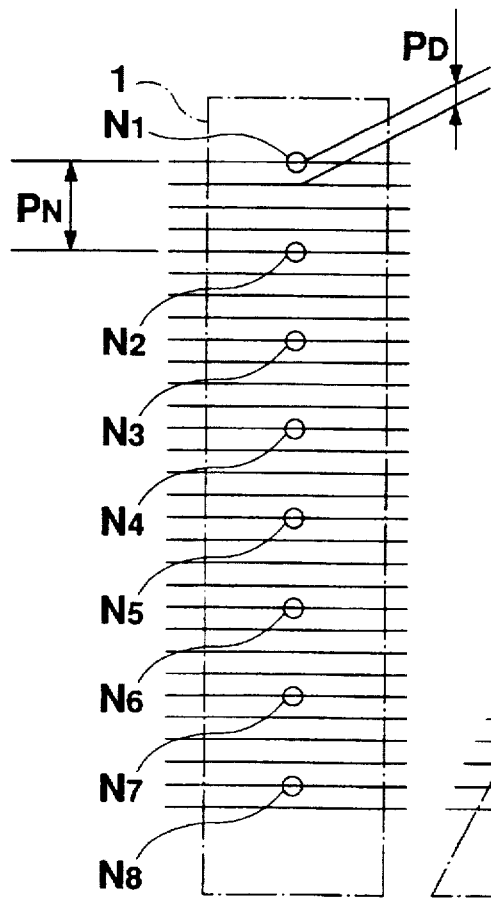
FIGS. 2A and 2B are diagrammatical view illustrating print heads according to the present invention.
Figure 2B:
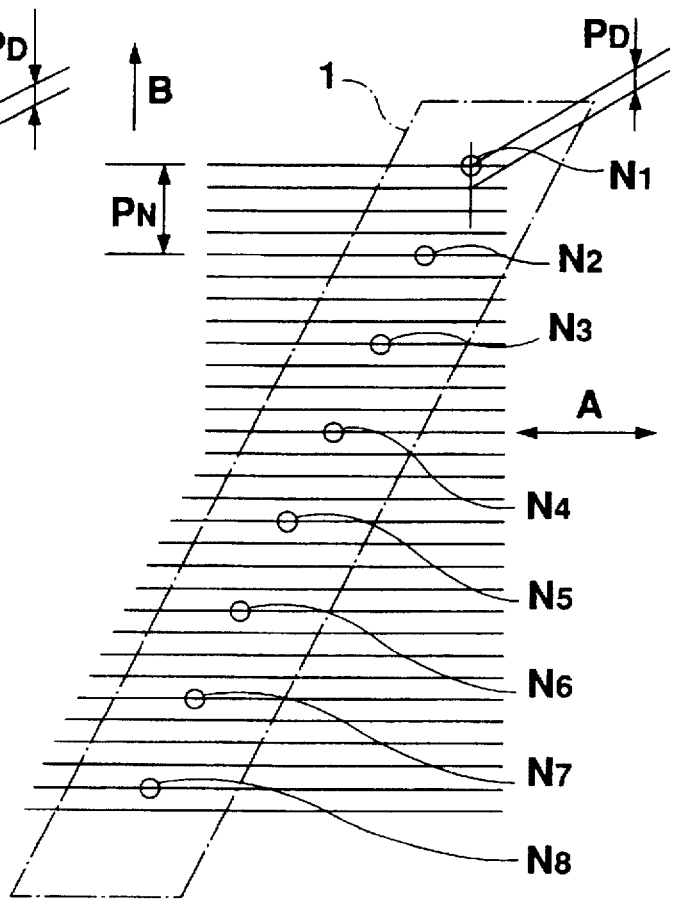

The print head 1 includes eight dot marking parts $N_1-N_8$ that are arranged in the sheet feed direction. In this embodiment, as shown in FIG. 2A, the arrangement pitch $P_N$ of these dot marking parts $N_1-N_8$ is set to be four times the print dot pitch $P_D$ in the sheet feed direction. The array of the dot marking parts $N_1-N_8$ may be inclined relative to the sheet feed direction as shown in FIG. 2B since it raises no problem for the arrangement pitch $P_N$ of the dot marking parts $N_1-N_8$ to be in any direction other than the sheet feed direction. If the array of the dot marking parts $N_1-N_8$ is inclined as shown in FIG. 2B, the spacing between the adjacent dot marking parts can be set to be larger than the arrangement pitch in the sheet feed direction. For example, this enables a high-density printing ink jet print head to be improved relative to the precision of arranged nozzles and to be more easily manufactured.

In the case of an ink jet print head, the dot marking parts $N_1-N_8$ are formed as ink jet nozzles. In the case of a thermal print head, the dot marking parts $N_1-N_8$ are formed as heating elements. In the case of a wire dot print head, the dot marking parts $N_1-N_8$ are formed as impact wires. In the thermal and wire dot print heads, an ink ribbon (not shown) will be located between the print head 1 and the recording sheet 4.

Figure 3:
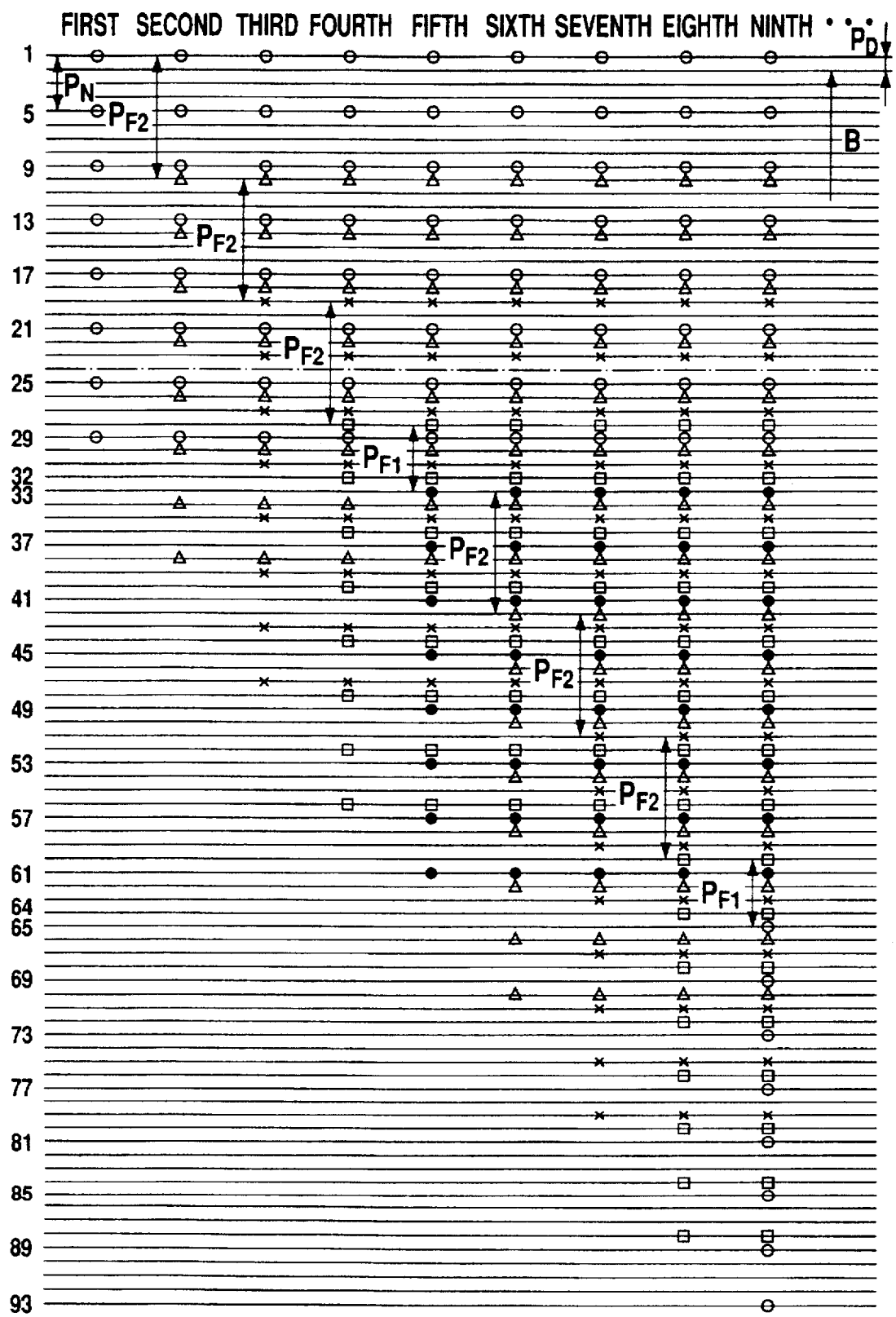
FIG. 3 is a view illustrating a printing method according to the present invention.

FIG. 3 illustrates the printing process in this embodiment. Each of the transversely extending lines represents one dot line. The spacing between the adjacent dot lines is the dot pitch $P_D$. Recording sheets are fed in a direction shown by arrow B in FIG. 3.

In this embodiment, the arrangement pitch $P_N$ of the dot marking parts $N_1-N_8$ is four times ($=m_Z$) the dot pitch $P_D$ and the number $\underline{n}$ of dot marking parts $N_1-N_8$ is eight, as shown. Thus, the ratio $\underline{a}$ of $\underline{n}$ to $m_Z$ becomes equal to two. Since $n-m_Z+1=5$ and $n+1=9$, the recording sheet will be fed nine times the dot pitch $P_D$ ($P_{F2}=9P_D$) after any print scanning step other than the 4k-th print scanning step. The sheet will be fed five times the dot pitch $P_D$ ($P_{F2}=5P_D$) after the 4k-th print scanning step. In other words, the sheet feed is controlled such that the sheet feed $P_{F2}$ is nine times the dot pitch $P_D$ after the first, second and third print scanning steps; the sheet feed $P_{F1}$ being five times the dot pitch $P_D$ after the fourth print scanning step; the sheet feed $P_{F2}$ is nine times the dot pitch $P_D$ after the fifth, sixth and seventh print scanning steps; and the sheet feed $P_{F1}$ is five times the dot pitch $P_D$ after the eighth print scanning step.

Such a printing process is diagrammatically shown in FIG. 3. Printed dots "○" are formed by the first print scanning step; "Δ" by the second and sixth print scanning steps; "X" by the third and seventh print scanning steps; "□" by the fourth and eighth print scanning steps; and "●" by the fifth print scanning step.

As can be seen from FIG. 3, the twenty-fifth to the thirty-second dot lines have been printed at the fourth print scanning step. Subsequently, dots to be printed will be sequentially filled in a continuous manner. In this embodiment, the first to twenty-fourth dot lines are imperfectly printed resulting in more widely spaced dots in the sheet feed direction. Therefore, the print head will be controlled such that the first dot in the twenty-fifth dot line is actually initially printed at the start end of the printing area in the sheet feed direction. More particularly, the seventh and eighth dot marking parts $N_7$, $N_8$ among the eight dot marking parts $N_1-N_8$ are used in the first print scanning step; the fifth to eighth dot marking parts $N_5-N_8$ are used in the second print scanning step; the third to eighth dot marking parts $N_3-N_8$ are used in the third print scanning step; and all the dot marking parts $N_1-N_8$ are used in the fourth and subsequent print scanning steps.

Similarly, the first to sixth dot marking parts $N_1-N_6$ are used in the third from last print scanning step; the first to fourth dot marking parts $N_1-N_4$ are used in the second from last print scanning step; and the first and second dot marking parts $N_1$, $N_2$ are used in the last print scanning step. Thus, the final end of the printing area in the sheet feed direction will be formed.

As can be seen from FIG. 3, the present invention always discretely forms printed dots relating to image formation at the ninth or fifth dot after each previous print scanning step, to print all the necessary dots while filling in blanks, even if some errors are produced in the sheet feed after each print scanning step, therefore, such errors are dispersed over a relatively wide range in the sheet feed direction. Such a function is totally different from the conventional serial print head printing methods wherein a printing area is continuously formed by joining a plurality of band-like printed areas in the sheet feed direction. As a result, any banding as produced by the conventional printing methods can be avoided to greatly improve the print quality.

Figure 4:
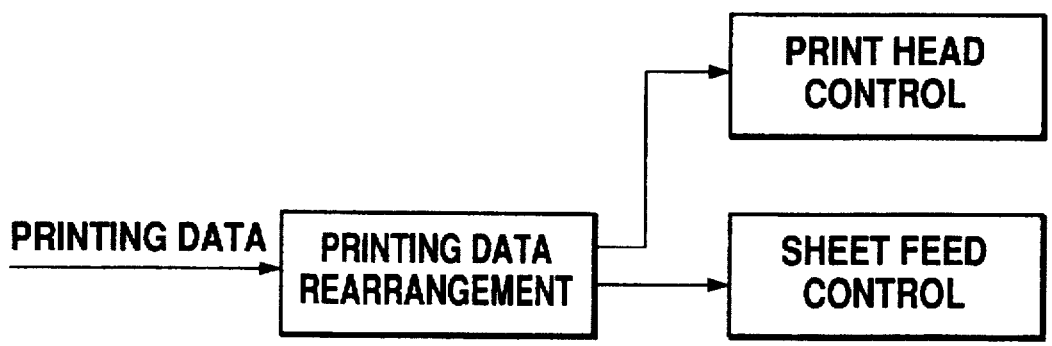
FIG. 4 is a block diagram illustrating a printing apparatus according to the present invention.

As can be seen from FIG. 3, printing data supplied to the dot marking parts $N_1-N_8$ in the print head embodying the present invention are different from those of the prior art. For example, in the first print scanning step, printing data for the first, fifth, ninth, thirteenth, seventeenth, twenty-second, twenty-fifth and twenty-ninth dot lines in the sheet feed direction may be respectively supplied to the first to eighth dot marking parts $N_1-N_8$. To perform the printing method of the present invention, therefore, the printing data must be rearranged. As shown in FIG. 4, the printing data are rearranged by printing data rearranging means 5 as described. According to the rearranged printing data, the print head 1 can be driven and controlled by print head control means 6. At the same time, sheet feed control means 7 controls the sheet feed in the sheet feed mechanism.

Figure 5:
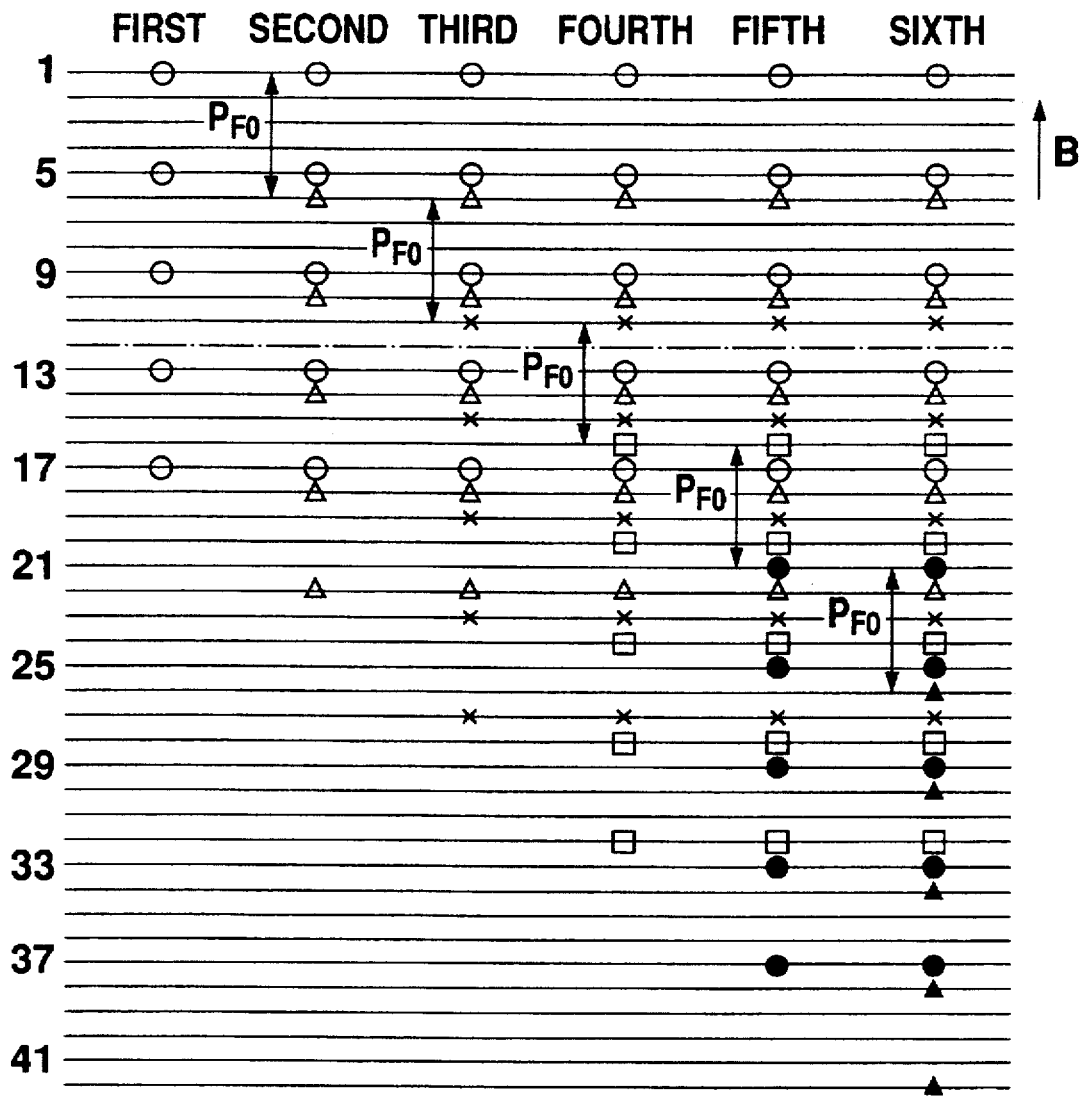
FIG. 5 is a view illustrating another printing method according to the present invention.

FIG. 5 illustrates a printing method according to another embodiment of the present invention. As in FIG. 3, each of the transversely extending lines represents one dot line. The spacing between the adjacent dot lines is the dot pitch $P_D$. Recording sheets are fed in a direction shown by arrow B.

As can be seen from FIG. 5, the present embodiment includes five ($=n$) dot marking parts that are arranged with a spacing four times the dot pitch $P_D$ ($=m_N$). The sheet feed pitch $P_{OF}$ is five times the dot pitch $P_D$ ($=m_{FO}$). The integer numbers $m_N$ ($=4$) and $m_{OF}$ ($=5$) are relatively prime. After termination of each print scanning step for one dot line, the sheet is fed through a five-dot pitch and the next dot line will be printed. FIG. 5 shows dot lines that are printed at each of the print scanning steps. The first print scanning step prints dot lines shown by "○"; the second print scanning step prints dot lines shown by "Δ"; the third print scanning step prints dot lines shown by "X"; the fourth print scanning step prints dot lines shown by "□"; the fifth print scanning step prints dot lines shown by "●"; the sixth print scanning step prints dot lines shown by "▲".

As can be seen from FIG. 5, the thirteenth to twentieth dot lines have been printed at the fourth print scanning step. Subsequently, dots to be printed will be continuously filled. In the present embodiment, non-printed dot lines exist in an area from the first dot line to the twelfth dot line. Thus, the actual printing areas extend from the thirteenth dot line. In the first print scanning step, the dot marking parts are inhibited to print the first, fifth and ninth dot lines. Even in the second and third print scanning steps, the dot lines before the thirteenth dot line will not be printed. Similarly, the dot marking parts are controlled such that no dot line after the last dot line will be printed in the third from last, second from last and the last print scanning steps.

In the present embodiment, each of the print scanning steps always prints dots relating to image formation at the fifth dot after any previous print scanning step to print all the necessary dots while sequentially filling blanks. Even if some errors are produced in the sheet feed after each print scanning step, therefore, such errors are dispersed over a relatively wide range in the sheet feed direction. As a result, any banding can be avoided, to thus improve the print quality.

In the present embodiment, printing data given to the dot marking parts in the print head are obtained by rearranging the printing data of the prior art.

It is to be understood that the scope of the present invention is not limited to the aforementioned embodiments. The important features of the present invention are the facts that the arrangement pitch $P_N$ of the dot marking parts $N_1-N_8$ in the print head 1 is set to be the dot pitch $P_D$ multiplied by an integer number and that the sheet feed is set to be the dot pitch $P_D$ multiplied by an integer number and also to be larger than the arrangement pitch $P_N$ of the dot marking parts $N_1$–$N_8$ in the print head 1. Thus, the discrete print dots relating to the image formation after the arrangement pitch $P_N$ can be sequentially formed so that the errors in each sheet feed will be dispersed in the sheet feed direction. Therefore, the actual setting of the sheet feed can be suitably selected depending on the above features. The present invention is not limited to the embodiments shown in FIGS. 3 and 5.

The present invention can also be applied to any other serial print head, such as thermal print head or wire dot print head, in addition to the ink jet print head.

Although the embodiments have been described as to a single print head for mono-color printing. If the present invention is to be applied to a color printing process, four of such ink jet print heads which may respectively contain, for example, Y(yellow), M(magenta), C(cyan) and B(black) inks may be mounted side by side in a printing machine to perform such a printing process as described through each of the print heads according to the present invention.

Furthermore, a single print head may include dot marking parts corresponding to each of three or more color inks, for example, Y, M, C and B color inks to perform a color printing process. In case of wire dot type and thermal transfer type printers, a single print head may be provided for each of various colors. Ink ribbons used may sequentially be changed from one to another to perform a color printing process.

We claim:

1. A printing method comprising the steps of scanning a serial print head in a direction perpendicular to the sheet feed direction to mark and print dots based on data with a given dot pitch $P_D$ in the sheet feed direction, said dots being marked through dot marking means of $\underline{n}$ in number which are arranged within a given marking width in the sheet feed direction with an arrangement pitch $P_N$ being said dot pitch multiplied by an integer number $m_N$, wherein the integer number $m_N$ is greater than one, the sheet being fed after said scanning step with a second pitch $P_{FO}$ that is larger than said arrangement pitch but smaller than said marking width and that is said dot pitch multiplied by an integer number $m_{FO}$.

2. A printing method as defined in claim 1 wherein the integer numbers $m_N$ and $m_{FO}$ are relatively prime and the integer number $m_{FO}$ is equal to said number $\underline{n}$.

3. A printing method comprising the steps of scanning a serial print head in a direction perpendicular to the sheet feed direction to mark and print dots based on data with a given dot pitch $P_D$ in the sheet feed direction, said dots being marked through dot marking means of $\underline{n}$ in number that are arranged within a given marking width in the sheet feed direction with a first pitch $P_N$ being said dot pitch multiplied by an integer number $m_N$, the number of said dot marking means being said integer number $m_N$ multiplied by an integer number, the sheet being fed with a second pitch $P_{F1}$ after the $km_N$-th scanning step, said second pitch being said dot pitch multiplied by ($n-m_N+1$), the sheet being fed with a third pitch $P_{F2}$ after any scanning step other than the $km_N$-th scanning step, said third pitch being said dot pitch multiplied by ($n+1$), $\underline{k}$ being any integer number.

4. A printing method as defined in claim 3 wherein the ratio of the integer numbers $\underline{n}$ to $m_N$ is equal to or larger than two.

5. A printing apparatus comprising a serial print head scanned in a direction perpendicular to the sheet feed direction to mark and print dots based on data with a given dot pitch in the sheet feed direction, said print head having dot marking means of $\underline{n}$ in number that are arranged within a given marking width in the sheet feed direction with a first pitch $P_N$ being said dot pitch multiplied by an integer number $m_N$, and a sheet feed mechanism for feeding the sheet after the previous scanning step with a second pitch that is smaller than said marking width but is said dot pitch multiplied by an integer number $m_{FO}$, said integer numbers $m_N$ and $m_{FO}$ being relatively prime, said integer number $m_{FO}$ being equal to said number $\underline{n}$.

6. A printing apparatus comprising a serial print head scanned in a direction perpendicular to the sheet feed direction to mark and print dots based on data with a given dot pitch $P_D$ in the sheet feed direction, said print head having dot marking means of $\underline{n}$ in number that are arranged within a given marking width in the sheet feed direction with a first pitch $P_N$ being said dot pitch multiplied by an integer number $m_N$, the number of said dot marking means being said integer number $m_n$ multiplied by an integer number, and a sheet feed mechanism for feeding the sheet with a second pitch $P_{F1}$ after the $km_N$-th scanning step, said second pitch being said dot pitch multiplied by ($n-m_N+1$), said sheet feed mechanism also being operative to feed the sheet with a third pitch $P_{F2}$ after any scanning step other than the $km_N$-th scanning step, said third pitch being said dot pitch multiplied by ($n+1$).

7. A printing apparatus as defined in claim 6 wherein the ratio of the integer numbers $\underline{n}$ to $m_N$ is equal to or larger than two.

8. A printing apparatus as defined in claim 6 wherein said print head is of ink jet type and wherein said dot marking means are in the form of an ink jet nozzle.

9. A printing apparatus as defined in claim 8 wherein said print head is for a mono-color printing process.

10. A printing apparatus as defined in claim 8 wherein said print head includes at least three color ink jets for performing a color printing process.

11. A printing apparatus as defined in claim 8, further comprising at least three print heads, each for executing a mono-color printing process, to thus perform a color printing process.

12. The printing apparatus of claim 5, wherein the integer number $m_N$ is greater than one.

\* \* \* \* \*